(12) United States Patent
Barhate et al.

(10) Patent No.: US 9,027,052 B2
(45) Date of Patent: May 5, 2015

(54) SYSTEM AND METHOD FOR IN-STREAM ADVERTISING ON AN INTERNET CONNECTED DEVICE

(71) Applicant: Adsparx USA Inc

(72) Inventors: Ketan Avinash Barhate, Thane (IN); Lilesh Sharad Ghadi, Mumbai (IN); Kunal Janardan Lagwankar, Thane (IN)

(*) Notice: Subject to any disclaimer, the term of this patent is extended or adjusted under 35 U.S.C. 154(b) by 0 days.

(21) Appl. No.: 13/872,110

(22) Filed: Apr. 28, 2013

(65) Prior Publication Data

US 2013/0305276 A1   Nov. 14, 2013

(30) Foreign Application Priority Data

May 4, 2012   (IN) .......................... 1384/MUM/2012

(51) Int. Cl.
| | |
|---|---|
| *H04N 7/10* | (2006.01) |
| *H04N 7/025* | (2006.01) |
| *H04N 21/81* | (2011.01) |
| *H04N 21/234* | (2011.01) |
| *H04N 21/61* | (2011.01) |
| *H04N 21/854* | (2011.01) |

(52) U.S. Cl.
CPC ........... *H04N 21/812* (2013.01); *H04N 21/234* (2013.01); *H04N 21/23424* (2013.01); *H04N 21/6125* (2013.01); *H04N 21/854* (2013.01)

(58) Field of Classification Search
CPC ....................... H04N 21/234; H04N 21/23424
See application file for complete search history.

(56) References Cited

U.S. PATENT DOCUMENTS

| | | | |
|---|---|---|---|
| 8,291,095 B2 * | 10/2012 | Cobb et al. ..................... 709/229 |
| 8,418,195 B1 | 4/2013 | Page et al. | |
| 8,424,036 B2 | 4/2013 | Haberman | |
| 2002/0021353 A1 * | 2/2002 | DeNies ........................... 348/36 |
| 2007/0100690 A1 * | 5/2007 | Hopkins .......................... 705/14 |
| 2008/0267222 A1 * | 10/2008 | Leung et al. ................... 370/503 |
| 2011/0209175 A1 * | 8/2011 | Bassali et al. ................... 725/32 |
| 2011/0271299 A1 | 11/2011 | Kakani et al. | |

* cited by examiner

*Primary Examiner* — Robert Hance
(74) *Attorney, Agent, or Firm* — The Law Office of Austin Bonderer, PC

(57) ABSTRACT

This invention discloses a system for in-stream advertising on an internet connected device comprising: at least a media streaming server adapted to stream media content in relation to a request from said internet connected device, said media streaming server further adapted to read and stream a concatenated file containing said media content and in-stream advertisement, on said internet connected device, in a single request from said internet connected device; at least an adinsert module adapted to concatenate said fetched advertisement and said media content; and at least a file writer configured to write said concatenated file containing fetched said media content and said in-stream advertisement in a single file in order to enable said media streaming server to read and stream said concatenated file on said internet connected device in a seamless manner.

3 Claims, 2 Drawing Sheets

SYSTEM AND METHOD FOR IN-STREAM ADVERTISING ON AN INTERNET CONNECTED DEVICE

FIELD OF THE INVENTION

This invention relates to the field of computer engineering, networks' engineering, and communication engineering.

Particularly, this invention relates to a system and method for in-stream advertising on an internet connected device

BACKGROUND OF THE INVENTION

The term, "internet connected device" or "internet enabled device", as used in this specification includes any device on which internet can be accessed. Typical examples of such device are mobile phones, computers, tablets, laptops or internet connected TV or set top box, and the like. As understood by a person having ordinary skill in the art, the internet connected device includes a processor and a memory unit.

The term, "media" or "media content" as used in this specification refers to audio, video, audio and video, text, pictures, frames, and the like visual and/or aural content along with combinations, thereof.

Advertising in a media content being streamed to viewers through internet is a very effective and efficient way of reaching out to public; especially for various product manufacturers and marketers and various service providers. Accessing of advertisements of interest on internet enabled devices while listening and/or watching a media content being streamed is of great convenience and benefit to the users of the devices. Advertisement in a media content, being streamed, is generally accessed on an internet enabled device as described herein.

Figure 1:
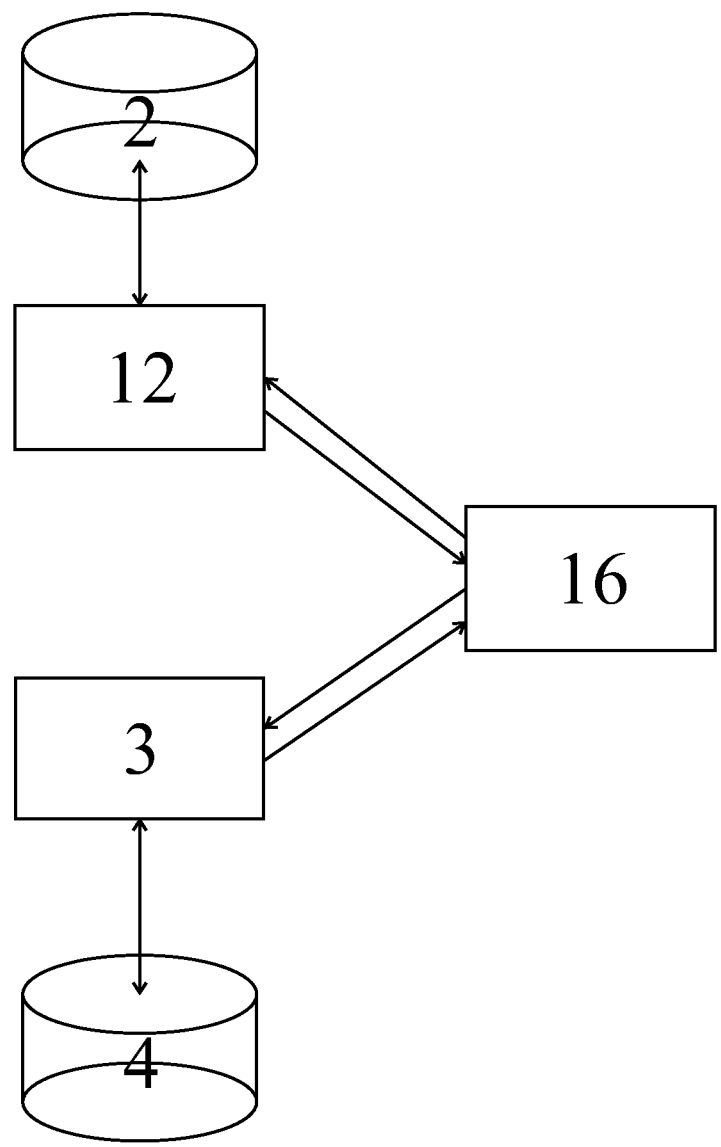

FIG. 1 illustrates a block diagram of the system for advertising and media content streaming on an internet connected device, according to the prior art.

The internet enabled device 16, and thereby its user thereof, queries a streaming server 12 for media content. The media streaming server 12 fetches media content from a media content database 2. The streaming server responds back to the device with the media content. At a point where an advertisement is to be inserted in the media content (i.e. at a cue point), the internet enabled device 16 queries an advertising server 3 for the advertisement. The advertising server 3 responds back to the device with the advertisement from an advertisement data base 4. On receipt of the advertisement, the internet connected device 16, typically, pauses the playback of the media content and starts playback of the advertisement. Once the advertisement playback is complete, the internet device resumes playback of the media content.

In such a system and method configuration, the internet enabled device is configured to communicate with both the servers, separately. Whenever the service provider introduces a new advertisement fetching logic for running on the internet connected device, it has to release upgrade of the advertisement fetching logic to all the users of the service. In other words, the advertisement fetching logic will have to be configured and upgraded continuously in all the internet enabled devices. In this era of multiple devices and multiple platforms for streaming media content and advertisement, installation of advertisement insert engines for each class of the internet connected devices is very costly, cumbersome, and time consuming.

Further, there is a buffering period or delay when the media content is paused and advertisement is started. Even if the advertisement is pre-fetched along with the media content (before the cue point is actually encountered), the buffering is likely to occur because the internet connected device has to pull out two streams; namely, media content and advertisement; simultaneously and separately. There is also a pause or delay or rebuffering between the completion of the play back of the advertisement and resumption of playback of the media content. Because of the delay and operational inconvenience, the interconnected device is also not user friendly.

Hence, there is a need for an improved system and method in order to provide in-stream advertisement on an internet connected device, which in-stream advertisement is inserted in streaming media content.

OBJECTS OF THE INVENTION

An object of the invention is to provide in-stream advertisement on an internet connected device, which in-stream advertisement is inserted in streaming media content.

Another object of the invention is to provide in-stream advertisement on an internet connected device, which in-stream advertisement is inserted in streaming media content in an efficient manner.

Yet another object of the invention is to provide in-stream advertisement on an internet connected device, which in-stream advertisement is inserted in streaming media content in a relatively less cumbersome manner.

Still another object of the invention is to provide in-stream advertisement on an internet connected device, which in-stream advertisement is inserted in streaming media content in a relatively faster manner.

An additional object of the invention is to provide in-stream advertisement on an internet connected device, which in-stream advertisement is inserted in streaming media content in a seamless manner.

Yet an additional object of the invention is to provide in-stream advertisement on an internet connected device, which in-stream advertisement is inserted in streaming media content by reducing buffer time.

Still an additional object of the invention is to provide in-stream advertisement on an internet connected device, which in-stream advertisement is inserted in streaming media content by reducing interruption of the media content streaming during the transition from media content streaming to advertisement streaming and/or from advertisement streaming to media content streaming.

Another additional object of the invention is to provide in-stream advertisement on an internet connected device, which in-stream advertisement is inserted in streaming media content and which advertisement is user-defined parameter based advertisement or system-defined parameter based advertisement.

SUMMARY OF THE INVENTION

According to the invention there is provided a system for in-stream advertising on an internet connected device comprising:

at least a media streaming server adapted to stream media content in relation to a request from said internet connected device, said media streaming server further adapted to read and stream a concatenated file containing said media content and in-stream advertisement, on said internet connected device, in a single request from said internet connected device;

at least an adinsert module adapted to communicate with said media streaming server to read said request in order to fetch advertisement, said adinsert module further adapted to concatenate said fetched advertisement and said media content; and at least a file writer configured to communicate with said adinsert module and to further write said concatenated file containing fetched said media content and said in-stream advertisement in a single file, said file writer further adapted to provide at least a file identifier parameter, and pass on said at least a file identifier parameter to said media streaming server in order to enable said media streaming server to read and stream said concatenated file on said internet connected device in a seamless manner.

Typically, said adinsert module comprises an adinsert plugin configured to communicate with said media streaming server and read said request from said media streaming server.

Typically, said adinsert module comprises an adinsert plugin configured to communicate with said media streaming server and read said request from said media streaming server and further comprises an adinsert engine configured to communicate with said adinsert plugin in order to receive said request, said adinsert engine further adapted to query and receive said advertisement from an advertisement server and to concatenate said advertisement with said media content.

Typically, said adinsert module is adapted to communicate with said media streaming server in order to read said request in order to fetch said advertisement, said adinsert module further adapted to concatenate said fetched advertisement and said media content based on pre-defined cue-points in said media content.

Typically, said system comprises a content database or a content management server adapted to be queried by said media streaming server in order to deliver said media content to said media streaming server.

Typically, said media streaming server is adapted to give a unique identity number to said request and to read and stream a file containing said media content and said advertisement simultaneously on said internet connected device.

Typically, said file writer comprises means to provide file identifier parameters, said file identifier parameters being selected from a group of file identifier parameters consisting of name of concatenated file, type of concatenated file, duration of concatenated file, size of concatenated file, location of concatenated file, cue points of concatenated file, advertisement related data of concatenated file, media content related data of concatenated file, and the like.

Typically, said adinsert module comprises an adinsert plugin configured to communicate with said media streaming server and read said request from said media streaming server and further comprises an adinsert engine configured to communicate with said adinsert plugin in order to receive said request, said adinsert engine further adapted to query and receive said advertisement from an advertisement server and to concatenate said advertisement with said media content, said adinsert engine further being configured to communicate with and receive request from said adinsert plugin, query and receive the advertisement from an advertising server storing advertisement data through an interface which allows user(s) of said internet connected device to convert all advertisement inventory into various resolutions and bitrates which may be close to those at which the media content is encoded.

Typically, said system comprises adinsert module adapted to concatenate said fetched advertisement and said media content, said concatenating involving the steps of involves adjustment of advertisement and media content parameters in accordance with pre-defined parameters, said pre-defined parameters being selected from a group of pre-defined parameters consisting of timestamps, serial identity, memory offsets or media format specific look up tables so that the internet connected device interprets the advertisement as a seamless part of the media content.

Typically, said adinsert module comprises an adinsert plugin configured to communicate with said media streaming server and read said request from said media streaming server, said adinsert plugin further comprises means to gather various internet connected device parameters which are pre-defined parameters selected from a group of pre-defined parameters consisting of IP address, time of connection, device type, user preferences, behavior available on or communicated by said internet connected device.

Typically, said system comprises adinsert module adapted to concatenate said fetched advertisement and said media content, said concatenating involving the step of concatenating said advertisement with said media content at predetermined cue points in said media content, said cue point being pre-defined by logic.

Typically, said system comprises adinsert module adapted to concatenate said fetched advertisement and said media content, said concatenating particularly involving the step of concatenating of said advertisement in said media content by matching video resolution and audio sampling rate and channels of said advertisement and media content in a single file, thereby providing in-stream advertisement with said media content.

Typically, said adinsert module comprises an adinsert plugin configured to communicate with said media streaming server and read said request from said media streaming server and further comprises an adinsert engine configured to communicate with said adinsert plugin in order to receive said request, said adinsert engine further adapted to query and receive said advertisement from an advertisement server and to concatenate said advertisement with said media content, said ad insert engine still further adapted to imitate request for advertisement at pre-defined cue points in order to ensures a smooth transition from media content streaming to advertisement streaming and/or from advertisement streaming back to media content streaming.

Typically, said system comprises at least an advertising server adapted to store advertisement(s) and further adapted to be queried by said advertisement module, said advertisement server further being adapted to respond with at least an advertisement upon querying, said response being based on pre-decided business logic.

Typically, said at least a file writer is adapted to write and save said advertisement and said media content in a file with a speed which is relatively higher than the speed of streaming of said at least a media streaming server.

According to this invention, there is also provided a method for in-stream advertising on an internet connected device comprises the steps of:

streaming media content, using at least a media streaming server, in relation to a request from said internet connected device;

reading and streaming a concatenated file containing said media content and in-stream advertisement, using said media streaming server, on said internet connected device, in a single request from said internet connected device;

reading said request, by said at least an adinsert module adapted to communicate with said media streaming server, in order to fetch advertisement;

concatenating said fetched advertisement and said media content using said adinsert module;

further writing said concatenated file containing fetched said media content and said in-stream advertisement in a single file, using at least a file writer configured to communicate with said adinsert module;

providing at least a file identifier parameter, by said file writer; and passing on said at least a file identifier parameter to said media streaming server in order to enable said media streaming server to read and stream said concatenated file on said internet connected device in a seamless manner.

Typically, said step of reading said request and said step of concatenating said fetched advertisement and said media content using said adinsert module comprises a further step of reading said request from said media streaming server using an adinsert plugin configured to communicate with said media streaming server.

Typically, said step of reading said request and said step of concatenating said fetched advertisement and said media content using said adinsert module comprises a further step of reading said request from said media streaming server using an adinsert plugin configured to communicate with said media streaming server and further comprises a step of querying and receiving said advertisement from an advertisement server and to concatenate said advertisement with said media content using an adinsert engine configured to communicate with said adinsert plugin in order to receive said request.

Typically, said step of reading said request and said step of concatenating said fetched advertisement and said media content using said adinsert module comprises a further step of concatenating said fetched advertisement and said media content based on pre-defined cue-points in said media content.

Typically, said method comprises a step of querying content database or a content management server in order to deliver said media content.

Typically, said step of streaming media content, using at least a media streaming server, comprises a step of giving unique identity number to said request and to read and stream a file containing said media content and said advertisement simultaneously on said internet connected device.

Typically, said step of providing at least a file identifier parameter, by said file writer comprises a step of providing file identifier parameters, said file identifier parameters being selected from a group of file identifier parameters consisting of name of concatenated file, type of concatenated file, duration of concatenated file, size of concatenated file, location of concatenated file, cue points of concatenated file, advertisement related data of concatenated file, media content related data of concatenated file, and the like.

Typically, said step of reading said request and said step of concatenating said fetched advertisement and said media content using said adinsert module comprises a further step of reading said request from said media streaming server using an adinsert plugin configured to communicate with said media streaming server and further comprises a step of querying and receiving said advertisement from an advertisement server and to concatenate said advertisement with said media content using an adinsert engine configured to communicate with said adinsert plugin in order to receive said request, said method further comprises a step of communicating with and receiving request from said adinsert plugin, using said adinsert engine, querying and receiving the advertisement from an advertising server storing advertisement data through an interface which allows user(s) of said internet connected device to convert all advertisement inventory into various resolutions and bitrates which may be close to those at which the media content is encoded.

Typically, said step of reading said request and said step of concatenating said fetched advertisement and said media content, said concatenating involving the steps of adjusting of advertisement and media content parameters in accordance with pre-defined parameters, said pre-defined parameters being selected from a group of pre-defined parameters consisting of timestamps, serial identity, memory offsets or media format specific look up tables so that the internet connected device interprets the advertisement as a seamless part of the media content.

Typically, said step of reading said request and said step of concatenating said fetched advertisement and said media content using said adinsert module comprises a further step of gathering various internet connected device parameters which are pre-defined parameters selected from a group of pre-defined parameters consisting of IP address, time of connection, device type, user preferences, behavior available on or communicated by said internet connected device.

Typically, said step of reading said request and said step of concatenating said fetched advertisement and said media content using said adinsert module, said concatenating involving the step of concatenating said advertisement with said media content at predetermined cue points in said media content, said cue point being pre-defined by logic.

Typically, said step of reading said request and said step of concatenating said fetched advertisement and said media content using said adinsert module, said concatenating particularly involving the step of concatenating of said advertisement in said media content by matching video resolution and audio sampling rate and channels of said advertisement and media content in a single file, thereby providing in-stream advertisement with said media content.

Typically, said step of reading said request and said step of concatenating said fetched advertisement and said media content using said adinsert module comprises a further step of reading said request from said media streaming server using an adinsert plugin configured to communicate with said media streaming server and further comprises a step of querying and receiving said advertisement from an advertisement server and to concatenate said advertisement with said media content using an adinsert engine configured to communicate with said adinsert plugin in order to receive said request, said method still further comprises a step of imitating request, using said adinsert engine, for advertisement at pre-defined cue points in order to ensures a smooth transition from media content streaming to advertisement streaming and/or from advertisement streaming back to media content streaming.

Typically, said method comprises a step of storing advertisement(s) on at least an advertising server and further comprises a step of querying by said advertisement module, said advertisement server further being adapted to respond with at least an advertisement upon querying, said response being based on pre-decided business logic.

Typically, said step of further writing said concatenated file containing fetched said media content and said in-stream advertisement in a single file, using at least a file writer configured to communicate with said adinsert module, further comprises a step of writing and saving said advertisement and said media content in a file with a speed which is relatively higher than the speed of streaming of said at least a media streaming server.

BRIEF DESCRIPTION OF THE ACCOMPANYING DRAWINGS

FIG. 1 illustrates a block diagram of the system for advertising and media content streaming on an internet connected device, according to the prior art.

Figure 2:
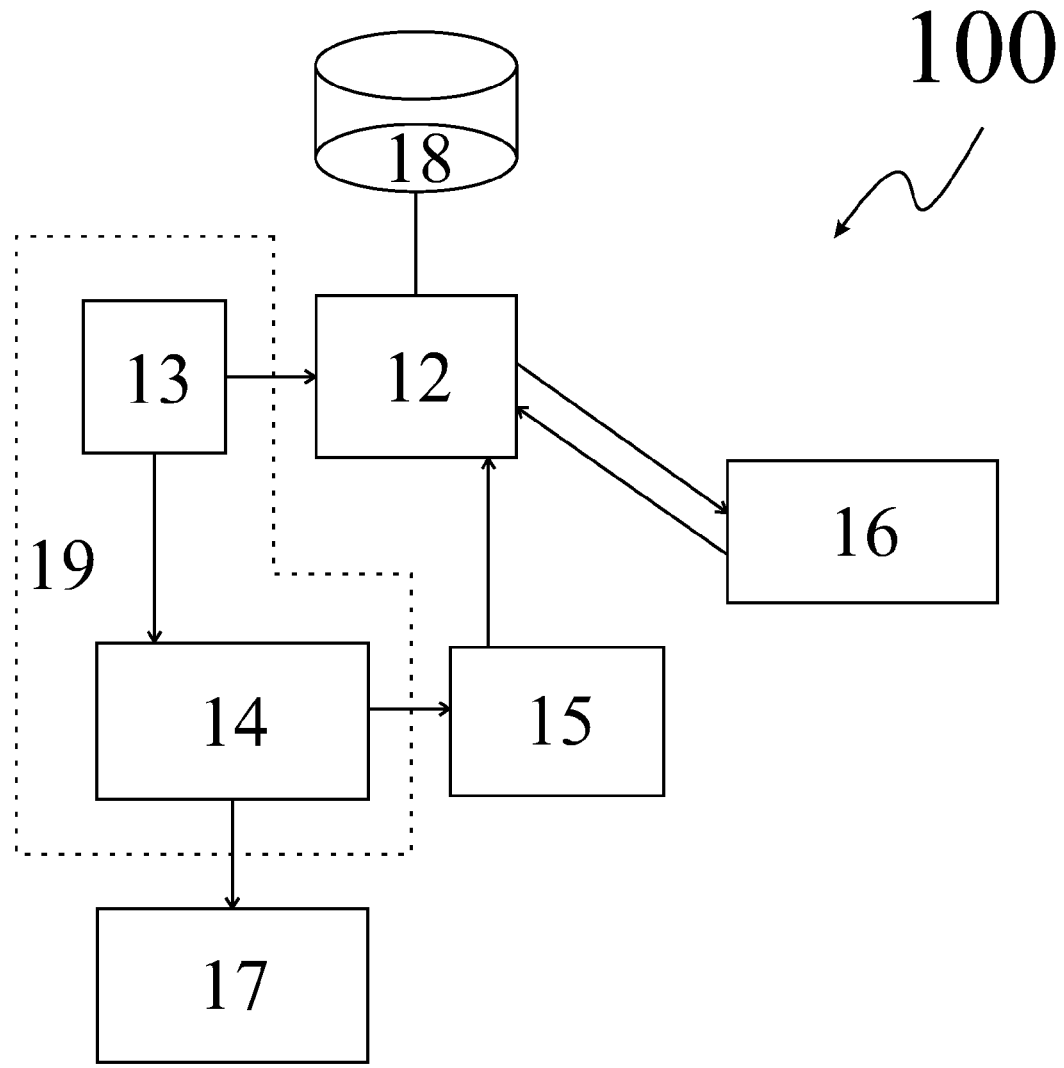

The invention will now be described in relation to the accompanying drawings, in which:

FIG. 2 illustrates a block diagram of the system for in-stream advertising on an internet connected device.

DETAILED DESCRIPTION OF THE ACCOMPANYING DRAWINGS

According to this invention, there is provided a system and method for in-stream advertising on an internet connected device.

FIG. 2 of the accompanying drawings represents a block diagram of the system for in-stream advertising on an internet connected device according to an embodiment of the invention.

In accordance with an embodiment of this invention, there is provided an internet enabled device 16 adapted to stream, fetch, display media content and advertisements.

In accordance with an embodiment of this invention, there is provided a media streaming server 12 adapted to receive a request from an internet enabled device 16. The request may be request for media content, for advertisement, or both. The media streaming server 12 is, further, adapted to stream media content and advertisement on the internet enabled device 16.

In accordance with another embodiment of this invention, there is provided an adinsert plugin 13 adapted to be communicably coupled to the media streaming server 12 and further adapted to receive a request for advertisement from the media streaming server.

In accordance with yet another embodiment of this invention, there is provided an adinsert engine 14 adapted to receive request for advertisement from the adinsert plugin 13. The adinsert plugin 13 is an interface between the media streaming server 12 and the adinsert engine 14. The adinsert engine 14 is adapted to query and retrieve advertisement.

In accordance with yet another embodiment of this invention, there is provided advertising server 17 contains advertisement selection logic. The advertising server 17 comprises or is coupled to a database of advertisements.

In accordance with still another embodiment of this invention, there is provided a media content database 18 adapted to contain media content items. Alternatively, there may be a content management server which comprises the media content items.

Preferably, the adinsert plugin 13 and the adinsert engine 14 form an adinsert module 19.

In accordance with still another embodiment of this invention, there is provided a file writer 15 adapted to communicate with the adinsert engine 14, write the media content and advertisement inserted in the media content in a single file. Typically, the file writer 15 also provides a name to the file and pass on the file name and location to the media streaming server 12.

The system 100 comprises a media streaming server 12, an adinsert plugin 13, an adinsert engine 14 and a file writer 15. Reference numeral 16 is an internet connected device or an internet enabled device. The media steaming server 12 is configured to receive a request from the internet connected device 16 for an advertisement to be inserted in a media content being streamed by the media streaming server 12. The media streaming server 12 is also configured to give a unique identity number to the request and to read and stream a file containing the media content and advertisement concatenated together simultaneously on the internet connected device 16. The adinsert plugin 13 is configured to communicate with the media streaming server 12 and read the request from the media streaming server 12.

The adinsert engine 14 is configured to communicate with and receive the request from the adinsert plugin 13, query and receive the advertisement from an advertising server 17 storing advertisement data through an interface which allows the user of the internet connected device 16 to convert all the advertisement inventory into various resolutions and bitrates which may be close to those at which the media content is encoded. The adinsert engine 14 is also configured to concatenate the advertisement with the media content at predetermined cue points in the media content. The file writer 15 is configured to communicate with the adinsert engine 14, write the media content and advertisement inserted in the media content in a single file, give a name to the file and pass on the file name and location to the media streaming server 12. Because of concatenating of the advertisement in the media content and matching of the resolutions and bitrates of the advertisement and media content and writing of both in a single file, the advertisement is integrated into the media content and becomes in-stream with the media content. Concatenating involves adjustment of advertisement and media content parameters like timestamps, serial ID, memory offsets or media format specific look up tables so that the internet connected device 16 interprets the advertisement as a seamless part of the media content. Concatenation is performed on encoded advertisement and media content. That is to say the files are not decoded and then encoded. The media streaming server reads the file containing both the media content and advertisement and streams the file 12 on the internet connected device 16 in a seamless manner.

The adinsert plugin 13 works in close coordination with the media streaming server 12. Plugin is a module that extends the functionality of the media streaming server. Examples of plugin include a module written for Wowza media server or a module written for Apache web server or a module written for a proprietary server. On receiving the request for insertion of an advertisement in the media content being streamed by the media streaming server 12, the request is redirected to the adinsert plugin 13 by the media streaming server 12. The adinsert plugin 13 gathers various internet connected device 16 parameters which are pre-defined parameters. These pre-defined parameters comprise IP address, time of connection, device type, user preferences or behavior available on or communicated by the internet connected device 16 and serves as an interface between the streaming server 12 and adinsert engine 14. Adinsert plugin 13 abstracts out the details of a variety of streaming servers in use and passes on the details to the adinsert engine 14. The adinsert engine 14 may reside on the same physical hardware as that on which the media streaming server 12 resides or it may be configured separately.

On receiving the request from the adinsert plugin 13, the adinsert engine 14 queries the advertising server 17 based on the various above parameters. The advertising server 17 responds back with the advertisement based on pre-decided business logic. Advertisements also could be stored locally on the same hardware as that of the adinsert engine 14 instead of being stored on the advertising server 17. Therefore, the advertising server 17 is optional. The adinsert engine 14 also does the task of concatenating the advertisement with the media content at pre-designated cue points on receiving the request from the adinsert plugin 13. The file writer 15 starts writing the advertisement and media content in a single file. The name of the file is decided based on the unique client identity number generated by the streaming server. Location of this file with the file name is passed on to the streaming server 12 to enable the streaming server to stream the advertisement inserted in the media content in a continuous manner.

The adinsert engine 14 also calculates the duration of the resultant file (media content+advertisement) and then informs the file writer 15 to start saving the file. On being informed by the file writer 15, the media streaming server 12 starts reading the file and streaming it to the internet connected device 16. The file writer 15 keeps writing and saving both the advertisement and media content in the file. The file is read by the streaming server 12 and written by the file writer 15 at the same time or in a subsequent fashion. The speed with which data is written by the file writer 15 is much higher than that at which the streaming server 12 reads the file ensuring that there is no rebuffering while streaming. The streaming of both the media content and advertisement takes places in a seamless manner.

The insert engine 14 may reside on the same physical hardware on which the media streaming server 12 resides or it may be configured separately.

According to the invention there is no need for the internet connected device 16 to communicate separately with an advertising server 17 and make a request for the advertisement. The request for the advertisement is imitated by the adinsert engine 14 at appropriate cue points, and streamed in a seamless manner by the media streaming server 12 after it is stitched together or concatenated with the media content. This ensures a smooth transition from media content streaming to advertisement streaming and/or from advertisement streaming back to media content streaming. As a result, buffering and rebuffering during streaming of the media content and the advertisement are avoided, leading to a better viewing experience for the user on the internet connected device 16.

The system of the invention is installed at the media streaming server 12 and all the actions take place at the media streaming server 12 end. The system eliminates the need for the service provider to introduce new advertisement fetching logic running on internet connected devices 16 each time an upgrade is required. Installation of the system at the media streaming server 16 end will automatically enable all the internet connected devices to receive the advertisement. Therefore, there is tremendous cost benefit, especially in this era of multiple devices and multiple platforms for streaming media content and advertisements. Besides cost benefit, the whole operation becomes easy and convenient. Operation of the internet connected device also becomes user friendly in terms of convenience and time.

While this detailed description has disclosed certain specific embodiments of the present invention for illustrative purposes, various modifications will be apparent to those skilled in the art which do not constitute departures from the spirit and scope of the invention as defined in the following claims, and it is to be distinctly understood that the foregoing descriptive matter is to be interpreted merely as illustrative of the invention and not as a limitation.

The invention claimed is:

1. A method for in-stream advertising on an internet connected device comprising the steps of:
   reading and streaming, to an internet connected device, a concatenated file containing media content and in-stream advertisement, using a media streaming server, in a single request from said internet connected device;
   reading said request, by an adinsert plugin adapted to communicate with said media streaming server, in order to fetch advertisement;
   querying and receiving, by an adinsert engine, an advertisement from an advertisement server;
   concatenating said received advertisement and said media content using said adinsert engine;
   further writing said concatenated file containing fetched said media content and said in-stream advertisement in a single file, using at least a file writer configured to communicate with said adinsert engine;
   providing at least a file identifier parameter, by said file writer; and passing on said at least a file identifier parameter to said media streaming server in order to enable said media streaming server to read and stream said concatenated file on said internet connected device in a seamless manner; and
   imitating a request from said internet connected device to said advertisement server by transmitting, by said adinsert engine to said advertisement server, a request for said advertisement at pre-defined cue points in order to ensure a smooth transition from media content streaming to advertisement streaming and from advertisement streaming back to media content streaming.

2. The method for in-stream advertising on said internet connected device as claimed in claim 1 further comprising adjusting said advertisement and media content parameters in accordance with pre-defined parameters, said pre-defined parameters being selected from a group of pre-defined parameters consisting of serial identity, memory offsets or media format specific look up tables so that the internet connected device interprets the advertisement as a seamless part of the media content.

3. The method for in-stream advertising on said internet connected device as claimed in claim 1 further comprising a step of writing and saving said advertisement and said media content in a file with a speed which is relatively higher than the speed of streaming of said media streaming server.

* * * * *